(12) United States Patent
Kawamura et al.

(10) Patent No.: US 9,049,056 B2
(45) Date of Patent: Jun. 2, 2015

(54) COMMUNICATION TERMINAL AND COMMUNICATION SYSTEM

(75) Inventors: Tomoaki Kawamura, Yokohama (JP); Koji Imaizumi, Funabashi (JP); Yoji Uchiyama, Tokyo (JP); Isao Takahashi, Koshigaya (JP)

(73) Assignee: NIKON CORPORATION, Tokyo (JP)

( * ) Notice: Subject to any disclaimer, the term of this patent is extended or adjusted under 35 U.S.C. 154(b) by 474 days.

(21) Appl. No.: 13/371,908

(22) Filed: Feb. 13, 2012

(65) Prior Publication Data

US 2012/0140995 A1   Jun. 7, 2012

Related U.S. Application Data

(63) Continuation of application No. PCT/JP2010/064001, filed on Aug. 19, 2010.

(30) Foreign Application Priority Data

Aug. 21, 2009   (JP) .................................. 2009-192190

(51) Int. Cl.
*H04L 12/66* (2006.01)
*G06K 9/00* (2006.01)
*H04L 12/64* (2006.01)

(52) U.S. Cl.
CPC ............ *H04L 12/6418* (2013.01); *H04L 12/66* (2013.01)

(58) Field of Classification Search
None
See application file for complete search history.

(56) References Cited

U.S. PATENT DOCUMENTS

| 2004/0152451 | A1* | 8/2004 | Park ........................... 455/412.1 |
| 2008/0137126 | A1* | 6/2008 | Yoshida ...................... 358/1.14 |
| 2008/0209519 | A1* | 8/2008 | Michio .............................. 726/3 |
| 2009/0142068 | A1* | 6/2009 | Takahashi et al. ............ 398/140 |
| 2010/0013923 | A1* | 1/2010 | Yakura .......................... 348/143 |
| 2010/0214925 | A1* | 8/2010 | Gormley .................... 370/235.1 |
| 2010/0260044 | A1* | 10/2010 | Gormley ....................... 370/230 |

FOREIGN PATENT DOCUMENTS

| CN | 1937457 A | 3/2007 | |
| JP | A-2001-197423 | 7/2001 | |
| JP | A-2001-256192 | 9/2001 | |
| JP | A-2001-268648 | 9/2001 | |
| JP | A-2005-11157 | 1/2005 | |
| JP | A-2007-18386 | 1/2007 | |
| WO | WO 2008/029658 A1 * | 3/2008 | ............. H04N 5/225 |

OTHER PUBLICATIONS

Nov. 25, 2013 Office Action issued in Chinese Application No. 201080030114.0 (with translation).
International Search Report issued in International Patent Application No. PCT/JP2010/064001 dated Oct. 5, 2010 (with translation).

(Continued)

*Primary Examiner* — Bernard Krasnic
(74) *Attorney, Agent, or Firm* — Oliff PLC

(57) ABSTRACT

A communication terminal may include a processing unit that includes information identifying another communication terminal as path information in data when the data is directly transmitted from its own communication terminal to the other communication terminal, and a transmitting unit that directly transmits the data in which the path information is included by the processing unit to the other communication terminal.

12 Claims, 1 Drawing Sheet

(56) References Cited

OTHER PUBLICATIONS

Written Opinion issued in International Patent Application No. PCT/JP2010/064001 dated Oct. 5, 2010 (with translation).

Jul. 23, 2014 Office Action issued in Chinese Patent Application No. 201080030114.0 (with translation).
May 7, 2014 Office Action issued in Japanese Patent Application No. 2011-527700 (with translation).

* cited by examiner

COMMUNICATION TERMINAL AND COMMUNICATION SYSTEM

CROSS REFERENCE TO RELATED APPLICATIONS

This application is a continuation application based on a PCT Patent Application No. PCT/JP2010/064001, filed Aug. 19, 2010, whose priority is claimed on Japanese Patent Application No. 2009-192190, filed Aug. 21, 2009, the entire content of which are hereby incorporated by reference.

BACKGROUND OF THE INVENTION

1. Field of the Invention

The present invention relates to a communication terminal and a communication system.

2. Description of the Related Art

Recently, faster wireless communication technology and the development of wideband have led to the integration of a wireless communication function into a portable telephone terminal, enabling it to function as a portable communication terminal.

As a usage of communication terminals described above, data may be directly transmitted from a communication terminal to another communication terminal. The communication terminal and the other communication terminal used herein may be stationary devices or portable communication terminals. The data, for example, may be a still image or a moving image captured by an electronic camera as a communication terminal.

There is a problem in that data can be unconditionally distributed when directly transmitted from one communication terminal to another communication terminal. Qn the other hand, technology for preventing a chain mail by using the number of transmission histories of data has been disclosed (for example, see Japanese Unexamined Patent Application, First Publication, No. 2005-11157).

However, there is a problem in that data is not sufficiently protected when the data is directly transmitted from one communication terminal to another communication terminal in the related art.

SUMMARY

The present invention has been made in view of the above-described circumstances, and an object of the invention is to provide a communication terminal and a communication system capable of more reliably protecting data when the data is directly transmitted from one communication terminal to another communication terminal.

According to the present invention for solving the above-described problem, there is provided a communication terminal including: a processing unit that includes information identifying another communication terminal as path information in data when the data is directly transmitted from its own communication terminal to the other communication terminal; and a transmitting unit for directly transmitting the data in which the path information is included by the processing unit to the other communication terminal.

The processing unit may process the data to protect the data for the other communication terminal when the data is directly transmitted from its own communication terminal to the other communication terminal.

The processing unit may process the data based on the path information when the data is processed.

The processing unit may detect a facial area included in the data and perform predetermined image processing for the detected facial area, if the data is an image when the data is processed.

The processing unit may include position information identifying a position of its own communication terminal in the data.

When its own communication terminal and the other communication terminal are again in a communication state, the processing unit may control the data based on whether or not the information identifying the other communication terminal is included in the path information.

The processing of the data may be performed based on the number of the other communication terminals included in the path information.

The processing of the data may include adding other data, and a ratio of the other data included in the data may be based on the number of the other communication terminals included in the path information.

According to the present invention, there is provided a communication system for directly transmitting data from a first communication terminal to a second communication terminal, wherein the first communication terminal directly transmits the data to the second communication terminal after including information identifying the second communication terminal as path information in the data when the data is directly transmitted from the first communication terminal to the second communication terminal.

The first communication terminal may process the data to protect the data for the second communication terminal when the data is directly transmitted from the first communication terminal to the second communication terminal.

The first communication terminal may process the data based on the path information when the data is processed.

The first communication terminal may detect a facial area included in the data and perform predetermined image processing for the detected facial area, if the data is an image when the data is processed.

The first communication terminal may include position information identifying a position of the first communication terminal in the data.

When the first communication terminal and the second communication terminal are again in a communication state, the first communication terminal may control the data based on whether or not the information identifying the second communication terminal is included in the path information.

The processing of the data may be performed based on the number of other communication terminals included in the path information.

The processing of the data may include adding other data, and a ratio of the other data included in the data may be based on the number of the other communication terminals included in the path information.

According to the present invention, it is possible to more reliably protect data when the data is directly transmitted from one communication terminal to another communication terminal.

DETAILED DESCRIPTION OF THE PREFERRED EMBODIMENTS

Figure 1:
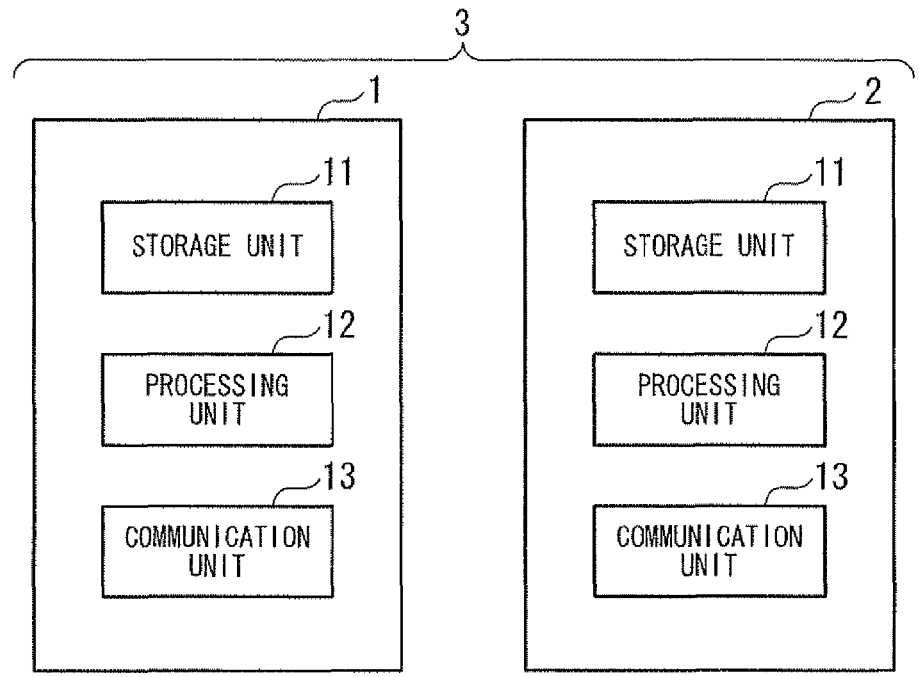
FIG. 1 is a block diagram showing a configuration of a wireless communication system according to an embodiment of the present invention.

Hereinafter, an embodiment of the present invention will be described with reference to the drawings. FIG. 1 is a schematic block diagram showing a configuration of a communication system according to an embodiment of the present invention. For example, the communication system 3 includes a communication terminal 1 and a communication terminal 2. Here, the case where data is directly transmitted from the communication terminal 1 to the communication terminal 2 in the communication system 3 will be described.

The communication terminals 1 and 2 are respectively identified by identification information in a communication environment of the communication system 3. An example of the identification information may be media access control (MAC) addresses. When both the communication terminals 1 and 2 are communicable via a telephone network, the identification information may be telephone numbers for identifying the communication terminals 1 and 2 in the telephone network. An example of the above-described communication terminals 1 and 2 may be communication terminals such as portable phones, imaging devices, or portable game devices.

Here, the case where a communication type of the communication terminals 1 and 2 is a communication type in which data is directed transmitted or received will be described. An example of the above-described communication type is Transfer Jet (registered trademark).

Transfer Jet is close-proximity wireless transfer technology using a band of 4.48 GHz as a center frequency. Its communication distance is a short distance within a few centimeters, but high-speed transmission is possible. For example, a transmission rate of a physical layer is up to 560 Mbps, and a maximum effective rate is as high as 375 Mbps. Because the communication distance is very short, the risk of data leakage in communication is low. Also, communication can be performed just by directly putting one of devices, which desire to communicate with each other, in the other device, or a device desired to be connected with its own device can be pre-registered.

The communication type according to this embodiment is not limited to Transfer Jet, and may be infrared communication, a wireless local area network (LAN), Bluetooth (registered trademark), an ultra-wideband (UWB), or the like.

Next, an example of a configuration of the communication terminals 1 and 2 will be described. Because the communication terminals 1 and 2 have the same configuration, only the configuration of the communication terminal 1 will be described here. The communication terminal 1 includes a storage unit 11, a processing unit 12, and a communication unit (transmitting unit) 13.

Data is stored in the storage unit 11. Here, the data, which is an image, will be described to be pre-stored in the storage unit 11. For example, if the communication terminal 1 is an imaging apparatus, an image captured by the communication terminal 1 itself may be stored in the storage unit 11 as data.

If data is directly transmitted from the communication terminal 1 to the communication terminal 2, the processing unit 12 includes information identifying the communication terminal 2 as path information in the data. For example, an area where the path information is stored is provided in the data. The processing unit 12 includes the information identifying the communication terminal 2 as the path information in the data by writing the information identifying the communication terminal 2 to the area where the path information is stored within the data. If the data is an image of the Joint Photographic Experts Group (JPEG) format based on an exchangeable image file (Exif) standard, an area provided to write a manufacturer's unique information called the manufacturer's note among Exif tag data may be the area where the path information as described above is stored.

The processing unit 12 sequentially writes the information identifying the communication terminal 2 to the area where the path information is stored. Thus, which order the data is transmitted from a communication terminal serving as a transmission source to a communication terminal serving as a transmission destination is recognized by referring to the path information.

When the data is directly transmitted from the communication terminal 1 to the communication terminal 2, the processing unit 12 processes the data to protect the data for the communication terminal 2. For example, when the data is a still image obtained by imaging a person, the processing unit 12 processes the data to protect the data by performing image processing of only the face of the person so that the person cannot be specified.

Specifically, the processing unit 12 detects a facial area of the person from the still image obtained by imaging the person by facial recognition technology. Next, the processing unit 12 performs the image processing in which the person is not specified, for example, by blur processing or mosaic processing for only the detected facial area of the person, thereby processing the data to protect the data.

Thereby, when the data is transmitted to the communication terminal, the data to be transmitted is subjected to the image processing in which the person is not specified. Consequently, when the data is transmitted, it is possible to protect portrait rights of the person, thereby protecting the data.

The communication unit 13 directly transmits data in which the path information is included by the processing unit 12 to another communication terminal. Also, the communication unit 13 directly transmits the data processed by the processing unit 12 to the other communication terminal.

When the data is received, the communication terminal 1 stores the received data via the communication unit 13 in the storage unit 11 by the processing unit 12.

Next, an example of an operation of the communication system described using FIG. 1 will be described using FIG. 2. Here, the operation of the communication system when the data is directly transmitted from the communication terminal 1 to the communication terminal 2 will be described.

First, when the data is directly transmitted from the communication terminal 1 to the communication terminal 2, the communication unit 13 of the communication terminal 1 and the communication unit 13 of the communication terminal 2 first establish communication between the communication terminal 1 and the communication terminal 2, respectively (step S10).

For example, the communication unit 13 of the communication terminal 1 and the communication unit 13 of the communication terminal 2 measure the strength of electromagnetic waves from a communication terminal serving as a communication target while outputting electromagnetic waves, and establish communication with the communication terminal serving as the communication target if the electromagnetic wave strength is greater than a predetermined strength, that is, if a distance from the communication terminal serving as the communication target is less than a predetermined distance.

Next, before the data is directly transmitted to the communication terminal 2, the communication terminal 1 receives identification information identifying the communication terminal 2 from the communication terminal 2 (step S20). For example, according to the establishment of communication between the communication terminal 1 and the communication terminal 2, or according to a request from the communication terminal 1, the communication terminal 2 transmits the identification information identifying itself to the communication terminal 1 via the communication unit 13 of the communication terminal 2. The communication terminal 1 receives the identification information identifying the communication terminal 2 from the communication terminal 2 via the communication unit 13 of the communication terminal 1.

Next, the processing unit 12 of the communication terminal 1 reads data to be transmitted from the storage unit 11, and the information identifying the communication terminal 2 received in step S20 is included as the path information in the read data (step S30). In terms of the selection of data to be transmitted from the data stored in the storage unit 11, the data may be selected at the side of the communication terminal 1, or may be selected at the side of the communication terminal 1 according to a request from the side of the communication terminal 2.

Next, the processing unit 12 of the communication terminal 1 processes the data to protect the data for the communication terminal 2 (step S40). For example, if the data is an image when the data is processed, the processing unit 12 detects a facial area included in the data, and performs predetermined image processing for the detected facial area.

Next, the communication unit 13 of the communication terminal 1 directly transmits the processed data in which the path information is included by the processing unit 12 via the communication established with the communication terminal 2 (step S50).

Thereafter, the communication terminal 2 stores the data received via the communication unit 13 in the storage unit 11 by the processing unit 12. Thereby, the data is directly transmitted from the communication terminal 1 to the communication terminal 2.

Figure 2:
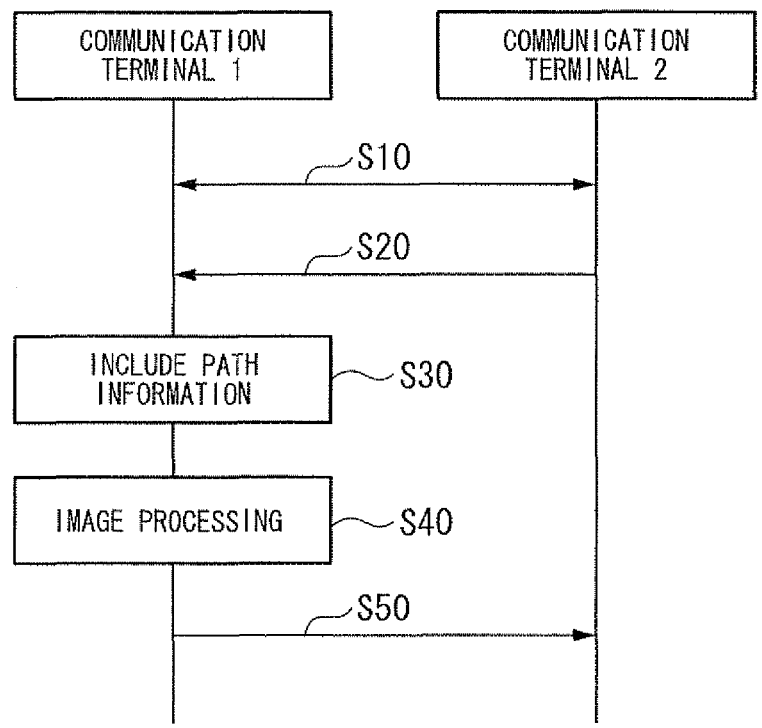
FIG. 2 is an operation diagram showing an example of an operation of the wireless communication system shown in FIG. 1.

Although the case where the communication between the communication terminals is established in FIG. 2 has been described, the communication between the communication terminals may be performed by a communication type using a request, an acknowledgement, and the like, without establishing the communication between the communication terminals.

As described above with reference to FIGS. 1 and 2, when the data is directly transmitted from the communication terminal 1 to the communication terminal 2, the communication terminal 1 directly transmits the data to the communication terminal 2 after including the identification information identifying the communication terminal 2 as the path information in the data.

Thereby, path information is included in data every time the data is transmitted from one communication terminal to another communication terminal. Thus, for example, it can be seen which path the data is transmitted through by referring to the path information.

In particular, in this embodiment, the communication terminal 1 transmits the data to the communication terminal 2 after the communication terminal 1 serving as a transmission source includes the identification information identifying the communication terminal 2 serving as a transmission destination as the path information in the data. As described above, the transmission destination (communication terminal 2) does not include the path information in the data, but in this embodiment, the transmission source (communication terminal 1) includes the path information in the data. That is, path information is not included in data at a receiving side after the data is transmitted, but in this embodiment, the path information is included in the data at a transmitting side before the data is transmitted. Consequently, it is possible to prevent the falsification or leakage of data during communication, and to securely transmit the data.

Although an example in which an area where path information is stored is provided in data has been described above, the area where the path information is stored may be an area where the data is first transmitted, for example, a header area, when the data is transmitted. By doing so, the path information is included in data already transmitted or in part of the data even when transmission is interrupted before the transmission of all the data is completed. Thus, it is possible to prevent data from excluding the path information or part of the data from being retained within the communication terminal serving as the transmission destination. Consequently, it is possible to more reliably protect the data.

Because a path is recognized by path information, it is effective in a marketing analysis or the like when data is distributed, or even when a data transmission history is desired to be known. Also, it is effective in preventing unauthorized copying.

When data is processed, the processing unit 12 may process the data based on the path information.

For example, a relationship between users of communication terminals is predetermined by identification information of the communication terminals. For example, it is possible to determine whether the relationship between the user of the communication terminal 1 and the user of the communication terminal 2 is that of family, distant relatives, friends, or acquaintances from the identification information of the communication terminals.

Specifically, the communication terminal 1 includes an associated information storage unit in which relationship information, which is information identifying the relationship between the communication terminal 1 and the communication terminal 2, is stored in advance to be associated with the identification information of the communication terminal 2.

When the data is processed, the processing unit 12 reads the relationship information associated with the communication terminal serving as the transmission destination from the associated information storage unit based on the path information, and determines the relationship between the communication terminal serving as the transmission destination and its own communication terminal based on the read associated information storage unit. The data is processed based on the result of the determination.

In the case of family, for example, the processing unit 12 does not perform image processing in which the person is not specified. In the case of distant relatives, friends, or acquaintances, the image processing of only a face of the person is performed so that the person is not specified, thereby processing data to protect the data. According to each case, i.e., family, relatives, friends or acquaintances, a blur amount in the blur processing or a mosaic level in the mosaic processing may be changed.

The case where the communication terminal 1 directly transmits the data to the communication terminal 2 after processing the data to protect the data for the communication terminal 2 when the data is directly transmitted from the communication terminal 1 to the communication terminal 2. In the description described above, the processing was image processing. However, the processing is not limited to the image processing, but may be processing of converting the data into binary data or encryption processing. Thereby, it is possible to more reliably protect the data.

The processing unit 12 may include position information identifying a position of the communication terminal 1 in the data. For example, the communication terminal 1 includes a position information detection unit, which detects the position information identifying the position of the communication terminal 1. An example of the position information detection unit is a position detection device using a global positioning system (GPS) device or a mobile telephone network. The processing unit 12 may include the position information identifying the position of the communication terminal 1 detected by the position information detection unit in the data. Like the path information, the position information may be sequentially included in the data.

Thereby, it can be seen whether data is transmitted and distributed in any position. When the position information is combined with the path information, it can be seen whether data is transmitted from any communication terminal to any other communication terminal in any position. The processing unit 12 may include time information as well as the position information in the data. Thereby, it can be seen when data has been transmitted.

An example in which the processing unit 12 includes the information identifying the communication terminal 2 as the path information in the data when the data is directly transmitted from the communication terminal 1 to the communication terminal 2 and the information identifying the communication terminal 2 is identification information for identifying each communication terminal in a communication environment of the communication system has been described above. However, the information identifying the communication terminal 2 is not limited to only the identification information for identifying each in the communication environment of the communication system, and may be a manufacturing serial number of the communication terminal 2, information identifying a manufacturer of the communication terminal 2, information identifying a type of the communication terminal 2, or information identifying a screen size of the communication terminal 2 or a size of images captured by the communication terminal 2.

Data may not be retransmitted to a communication terminal described in the path information. When data is retransmitted to the communication terminal described in the path information, a warning may be generated. A redistribution approval/disapproval setting for data to each communication terminal may be added to the path information. Thereby, the distribution of data can be controlled.

The date of a data transmission/reception may be recorded in the path information. Old path information may be deleted.

The writing location of path information of the receiving side and path information of the transmission destination may be different. Thereby, the path information of the receiving side and the path information of the transmission destination can be separately managed.

The path information may be used as key information. In this case, data is reproduced only when a combination of specific communication terminals is included in the path information.

According to the above-described information, the communication terminal 1 may process data to be transmitted to the communication terminal 2. For example, the communication terminal 1 may perform processing to change an image size of data to be transmitted according to a size of an image captured by the communication terminal 2. For example, it is possible to protect data because the receiving side does not check a detailed part of an image when an image size is small in the transmission. An image data compression rate as well as the image size may be changed.

The processing may be based on the number of the communication terminals described in the path information. Processing may be performed in which the more communication terminals are described in the path information, the worse data is degraded. In this case, when data is an image, for example, processing in which the image is degraded or a resolution is low is performed. When data is a moving image, for example, processing in which a frame rate is low is performed.

Processing may be performed in which the more communication terminals are described in the path information, the more objects are removed from data. Thereby, when data is an image, it is possible to know the number of communication terminals through which the data has passed, that is, the number of distributions of the data, from a loss state of the image.

Processing involving overlapping and displaying an icon corresponding to an identifier (ID) of each communication terminal with data every time the data passes through the communication terminal may be performed. Thereby, communication terminals through which the data has passed may be seen from the data. Further, contact with a communication terminal corresponding to an icon may be made by designating the icon.

Premium information such as a coupon may be displayed on data according to the number of the communication terminals described in the path information.

An advertisement may be added to data every time the data passes through a communication terminal. Advertising profits may be returned to a distributor of original data. The original data may be viewed by clicking on the advertisement.

When data is retransmitted to a communication terminal described in the path information, the data may be retransmitted without performing processing such as mosaic in consideration of authentication completion.

When data is processed, new path information may be created by resetting path information in a state in which identification information of a communication terminal of original data remains.

The path information may be used as key information of a group of communication terminals. In this case, the display of data is changed according to the number of the communication terminals provided within the group.

According to the number of the communication terminals described in the path information, data may be sorted and the result of sorting may be displayed. Whether or not a specific communication terminal is described in the path information may be extracted and found.

When the data is an image to be transmitted, the processing unit 12 of the communication terminal 1 may generate data of an image size that is just large enough for a user of the receiving side terminal to view, i.e., a thumbnail, and transmit the generated thumbnail to the communication terminal 2. Thereby, it is possible to protect data because the data itself is not transmitted. The user of the communication terminal 2 can recognize the image from the received thumbnail.

Although the communication type of direct transmission and direct reception from the communication terminal 1 to the communication terminal 2 have been described, for example, a communication type in which data is transmitted and received from the communication terminal 1 to the communication terminal 2 via a server device may be provided. In this case, processing to be executed by the processing unit 12 described above may be executed by the processing unit 12 or by the server device.

Only a key may be transferred without transferring data itself, and the data itself may be stored on a server. The key includes the right to access the data and data position information such as a server link. The right to access the data may have a period of expiration. The data is accessed via the server link included in the key. In this case, path information is included in the key.

Although the case where data is an image has been described above, the data may be a still image, a moving image, a sound, or a document.

The storage unit 11 is configured by a hard disk device, a magneto-optical disk device, a nonvolatile memory such as a flash memory, a read-only storage medium such as a compact disk-read-only memory (CD-ROM), a volatile memory such as a random access memory (RAM), or a combination thereof.

The processing unit 12 may be implemented by dedicated hardware. Also, the processing unit 12 may be configured by a memory and a central processing unit (CPU). A function of the processing unit 12 may be implemented by loading and executing a program for implementing the function of the processing unit 12 in the memory.

Processing by the processing unit 12 may be executed by recording the program for implementing the function of the processing unit 12 of FIG. 1 on a computer-readable recording medium and causing a computer system to read and execute the program recorded on the recording medium. The computer system includes an operating system (OS) and hardware such as peripheral devices.

The computer system includes a homepage-providing environment (or displaying environment) when the World. Wide Web (WWW) system is used.

The computer readable recording medium is a portable medium such as a flexible disk, a magneto-optical disk, ROM and CD-ROM, or a storage device such as a hard disk built into the computer system. Furthermore, the computer readable recording medium may also include a medium that dynamically holds a program for a short period of time, such as a communication line when a program is transmitted via a network such as the Internet or a communication line such as a telephone line, and a medium that holds a program for a fixed period of time, such as a volatile memory in a computer system serving as a server or client in the above situation. The program may be for implementing the above functions, or the above functions may be implemented in combination with a program already recorded on the computer system.

Embodiments of the present invention have been described in detail with reference to the drawings. However, specific configurations are not limited to the described embodiments, and various modifications can be made without departing from the spirit of the invention and the scope of the appended claims.

According to the present invention, it is possible to more reliably protect data when the data is directly transmitted from one communication terminal to another communication terminal. Further, it is possible to add an advertisement to the data using path information of the data.

What is claimed is:

1. A communication terminal comprising:
    a processing unit that includes information identifying another communication terminal as path information in data when the data is directly transmitted from its own communication terminal to the other communication terminal; and
    a transmitting unit that directly transmits the data in which the path information is included by the processing unit to the other communication terminal,
    wherein the processing unit processes the data to protect the data for the other communication terminal when the data is directly transmitted from its own communication terminal to the other communication terminal,
    wherein the processing unit processes the data based on the path information when the data is processed,
    wherein the processing of the data is performed based on a number of the other communication terminals included in the path information,
    wherein the processing of the data includes adding other data, and
    wherein a ratio of the other data included in the data is based on the number of the other communication terminals included in the path information.

2. The communication terminal according to claim 1, wherein the processing unit detects a facial area included in the data and performs predetermined image processing for the detected facial area, if the data is an image when the data is processed.

3. The communication terminal according to claim 1, wherein the processing unit includes position information identifying a position of its own communication terminal in the data.

4. The communication terminal according to claim 1, wherein, when its own communication terminal and the other communication terminal are again in a communication state, the processing unit controls the data based on whether or not the information identifying the other communication terminal is included in the path information.

5. A communication system that directly transmits data from a first communication terminal to a second communication terminal,
    wherein the first communication terminal directly transmits the data to the second communication terminal after including information identifying the second communication terminal as path information in the data when the data is directly transmitted from the first communication terminal to the second communication terminal,
    wherein the first communication terminal processes the data to protect the data for the second communication terminal when the data is directly transmitted from the first communication terminal to the second communication terminal,
    wherein the first communication terminal processes the data base on the path information when the data is processed,
    wherein the processing of the data is performed based on a number of other communication terminals included in the path information,
    wherein the processing of the data includes adding other data, and
    wherein a ratio of the other data included in the data is based on the number of the other communication terminals included in the path information.

6. The communication system according to claim 5, wherein the first communication terminal detects a facial area included in the data and performs predetermined image processing for the detected facial area, if the data is an image when the data is processed.

7. The communication system according to claim 5, wherein the first communication terminal includes position information identifying a position of the first communication terminal in the data.

8. The communication system according to claim 5, wherein, when the first communication terminal and the second communication terminal are again in a communication state, the first communication terminal controls the data based on whether or not the information identifying the second communication terminal is included in the path information.

9. A communication terminal comprising:
a processing unit that, when data is directly transmitted from its own communication terminal to another communication terminal, generates information identifying the another communication terminal as path information; and
a transmitting unit that directly transmits the path information generated by the processing unit and the data to the another communication terminal,
wherein the processing unit processes the data to protect the data for the another communication terminal when the data is directly transmitted from its own communication terminal to the another communication terminal,
wherein the processing unit processes the data based on the path information when the data is processed,
wherein the processing of the data is performed based on a number of the another communication terminals included in the path information,
wherein the processing of the data includes adding other data, and
wherein a ratio of the other data included in the data is based on the number of the another communication terminals included in the path information.

10. The communication terminal according to claim 9, wherein the processing unit detects a facial area included in the data and performs predetermined image processing for the detected facial area, if the data is an image when the data is processed.

11. The communication terminal according to claim 9, wherein the processing unit includes position information identifying a position of its own communication terminal in the data.

12. The communication terminal according to claim 9, wherein, when its own communication terminal and the another communication terminal are again in a communication state, the processing unit controls the data based on whether or not the information identifying the another communication terminal is included in the path information.

* * * * *